US011310816B2

(12) United States Patent
Manolakos et al.

(10) Patent No.: US 11,310,816 B2
(45) Date of Patent: Apr. 19, 2022

(54) ASSOCIATING A DOWNLINK REFERENCE SIGNAL FOR POSITIONING OF A USER EQUIPMENT WITH AN UPLINK REFERENCE SIGNAL FOR TRANSMISSION BY THE USER EQUIPMENT

(71) Applicant: QUALCOMM Incorporated, San Diego, CA (US)

(72) Inventors: Alexandros Manolakos, San Diego, CA (US); Sony Akkarakaran, Poway, CA (US); Joseph Binamira Soriaga, San Diego, CA (US); Tao Luo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/439,535

(22) Filed: Jun. 12, 2019

(65) Prior Publication Data
US 2020/0022167 A1 Jan. 16, 2020

(30) Foreign Application Priority Data
Jul. 10, 2018 (GR) .............................. 20180100312

(51) Int. Cl.
*H04W 72/12* (2009.01)
*H04W 72/04* (2009.01)
(Continued)

(52) U.S. Cl.
CPC ....... *H04W 72/1273* (2013.01); *H04L 5/0048* (2013.01); *H04W 4/029* (2018.02); *H04W 72/042* (2013.01)

(58) Field of Classification Search
CPC ............ G01S 5/02; H04B 7/04; H04L 5/0048; H04W 4/02; H04W 4/029; H04W 64/00;
(Continued)

(56) References Cited
U.S. PATENT DOCUMENTS

2014/0112260 A1* 4/2014 Sorrentino .......... H04W 52/325
370/329
2017/0288897 A1 10/2017 You et al.
(Continued)

FOREIGN PATENT DOCUMENTS

WO 2018028787 A1 2/2018
WO 2019027680 A2 2/2019
WO 2019213914 A1 11/2019

OTHER PUBLICATIONS

Ericsson: "On UL Beam Indication", 3GPP Draft; R1-1718747_On UL Beam Indication, 3rd Generation Partnership Project (3GPP), Mobile Competence Centre, 650, Route Des Lucioles, F-06921 Sophia-Anti Polis Cedex, France, vol. RAN WG1, No. Prague, CZ; Oct. 9, 2017-Oct. 13, 2017, Oct. 8, 2017 (Oct. 8, 2017), 4 Pages, XP051341917, Retrieved from the Internet: URL: http://www.3gpp.org/ftp/Meetings_3GPP_SYNC/RAN1/Docs/ [retrieved on Oct. 8, 2017], Section 2.
(Continued)

*Primary Examiner* — Minh Trang T Nguyen
(74) *Attorney, Agent, or Firm* — Thien T. Nguyen

(57) ABSTRACT

In an embodiment, a network entity schedules, as part of a positioning procedure for a UE, a first set of resources for transmission of DL RS(s) by at least one BS to the UE. The network entity associates the DL RS(s) with UL RS(s) for transmission by the UE on a second set of resources to one or more BSs as part of the positioning procedure for the UE. The network entity transmits, to the UE, an indication of the association between the DL RS(s) and the UL RS(s). The UE receives the indication along with the DL RS(s) from the at
(Continued)

least one BS. The UE transmits the UL RS(s) to the one or more BSs on the second set of resources in response to the received indication.

30 Claims, 12 Drawing Sheets

(51) Int. Cl.
*H04W 4/029* (2018.01)
*H04L 5/00* (2006.01)

(58) Field of Classification Search
CPC .......... H04W 72/042; H04W 72/1273; H04W 80/02; H04W 80/10
See application file for complete search history.

(56) References Cited

U.S. PATENT DOCUMENTS

| | | | |
|---|---|---|---|
| 2017/0289953 A1 | 10/2017 | Chae | |
| 2019/0230618 A1* | 7/2019 | Saur | G01S 5/0236 |
| 2019/0320467 A1* | 10/2019 | Freda | H04W 74/0833 |
| 2020/0059398 A1* | 2/2020 | Pan | H04W 72/0413 |
| 2020/0068549 A1* | 2/2020 | Kang | H04B 7/0695 |

OTHER PUBLICATIONS

International Search Report and Written Opinion—PCT/US2019/037053—ISA/EPO—dated Sep. 16, 2019.

\* cited by examiner

ASSOCIATING A DOWNLINK REFERENCE SIGNAL FOR POSITIONING OF A USER EQUIPMENT WITH AN UPLINK REFERENCE SIGNAL FOR TRANSMISSION BY THE USER EQUIPMENT

CROSS-REFERENCE TO RELATED APPLICATION

The present application for patent claims priority under 35 U.S.C. § 119 to Greek Patent Application No. 20180100312 entitled, "ASSOCIATING A DOWNLINK REFERENCE SIGNAL FOR POSITIONING OF A USER EQUIPMENT WITH AN UPLINK REFERENCE SIGNAL FOR TRANSMISSION BY THE USER EQUIPMENT", filed with the Greek Patent and Trademark Office on Jul. 10, 2018, and assigned to the assignee hereof and hereby expressly incorporated herein by reference in its entirety.

TECHNICAL FIELD

Various aspects described herein generally relate to wireless communication systems, and more particularly, to associating a downlink reference signal for positioning of a user equipment with an uplink reference signal for transmission by the user equipment.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device may also transmit its own ranging signal(s) that are measured by the two or more network nodes, either as part of a separate positioning procedure or to facilitate calculation of round trip propagation time (RTT) between the mobile device and the two or more network nodes.

SUMMARY

An embodiment is directed to a method of operating a network entity, comprising scheduling, as part of a positioning procedure for a user equipment (UE), a first set of resources for transmission of at least one downlink (DL) reference signal (RS) by at least one base station to the UE, associating the at least one DL RS with at least one uplink (UL) RS for transmission by the UE on a second set of resources to one or more base stations as part of the positioning procedure for the UE, and transmitting, to the UE, an indication of the association between the at least one DL RS and the at least one UL RS.

Another embodiment is directed to a method of operating a user equipment (UE), comprising receiving, from at least one base station as part of a positioning procedure for the UE, at least one downlink (DL) reference signal (RS) on a first set of resources, receiving, from a network entity, an indication of an association between the at least one DL RS with at least one uplink (UL) RS for transmission by the UE, and transmitting, to one or more base stations in response to the received indication, the at least one UL RS on a second set of resources as part of the positioning procedure for the UE.

Another embodiment is directed to a network entity, comprising means for scheduling, as part of a positioning procedure for a user equipment (UE), a first set of resources for transmission of at least one downlink (DL) reference signal (RS) by at least one base station to the UE, means for associating the at least one DL RS with at least one uplink (UL) RS for transmission by the UE on a second set of resources to one or more base stations as part of the positioning procedure for the UE, and means for transmitting, to the UE, an indication of the association between the at least one DL RS and the at least one UL RS.

Another embodiment is directed to a user equipment (UE), comprising means for receiving, from at least one base station as part of a positioning procedure for the UE, at least one downlink (DL) reference signal (RS) on a first set of resources, means for receiving, from a network entity, an indication of an association between the at least one DL RS with at least one uplink (UL) RS for transmission by the UE, and means for transmitting, to one or more base stations in response to the received indication, the at least one UL RS on a second set of resources as part of the positioning procedure for the UE.

Another embodiment is directed to a network entity, comprising a memory, at least one processor coupled to the memory and at least one transceiver and configured to schedule, as part of a positioning procedure for a user equipment (UE), a first set of resources for transmission of at least one downlink (DL) reference signal (RS) by at least one base station to the UE, associate the at least one DL RS with at least one uplink (UL) RS for transmission by the UE on a second set of resources to one or more base stations as part of the positioning procedure for the UE, and transmit, to the UE, an indication of the association between the at least one DL RS and the at least one UL RS.

Another embodiment is directed to a user equipment (UE), comprising a memory, at least one processor coupled to the memory and at least one transceiver and configured to receive, from at least one base station as part of a positioning procedure for the UE, at least one downlink (DL) reference signal (RS) on a first set of resources, receive, from a network entity, an indication of an association between the at least one DL RS with at least one uplink (UL) RS for transmission by the UE, and transmit, to one or more base stations in response to the received indication, the at least one UL RS on a second set of resources as part of the positioning procedure for the UE.

Another embodiment is directed to a non-transitory computer-readable medium containing instructions stored thereon, which, when executed by a network entity, cause the network entity to perform operations, the operations comprising at least one instruction to cause the network entity to schedule, as part of a positioning procedure for a user equipment (UE), a first set of resources for transmission of at least one downlink (DL) reference signal (RS) by at least one base station to the UE, at least one instruction to cause the network entity to associate the at least one DL RS with at least one uplink (UL) RS for transmission by the UE on a second set of resources to one or more base stations as part of the positioning procedure for the UE, and at least one instruction to cause the network entity to transmit, to the UE, an indication of the association between the at least one DL RS and the at least one UL RS.

Another embodiment is directed to a non-transitory computer-readable medium containing instructions stored thereon, which, when executed by a user equipment (UE), cause the UE to perform operations, the operations comprising at least one instruction to cause the UE to receive, from at least one base station as part of a positioning procedure for the UE, at least one downlink (DL) reference signal (RS) on a first set of resources, at least one instruction to cause the UE to receive, from a network entity, an indication of an association between the at least one DL RS with at least one uplink (UL) RS for transmission by the UE, and at least one instruction to cause the UE to transmit, to one or more base stations in response to the received indication, the at least one UL RS on a second set of resources as part of the positioning procedure for the UE.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
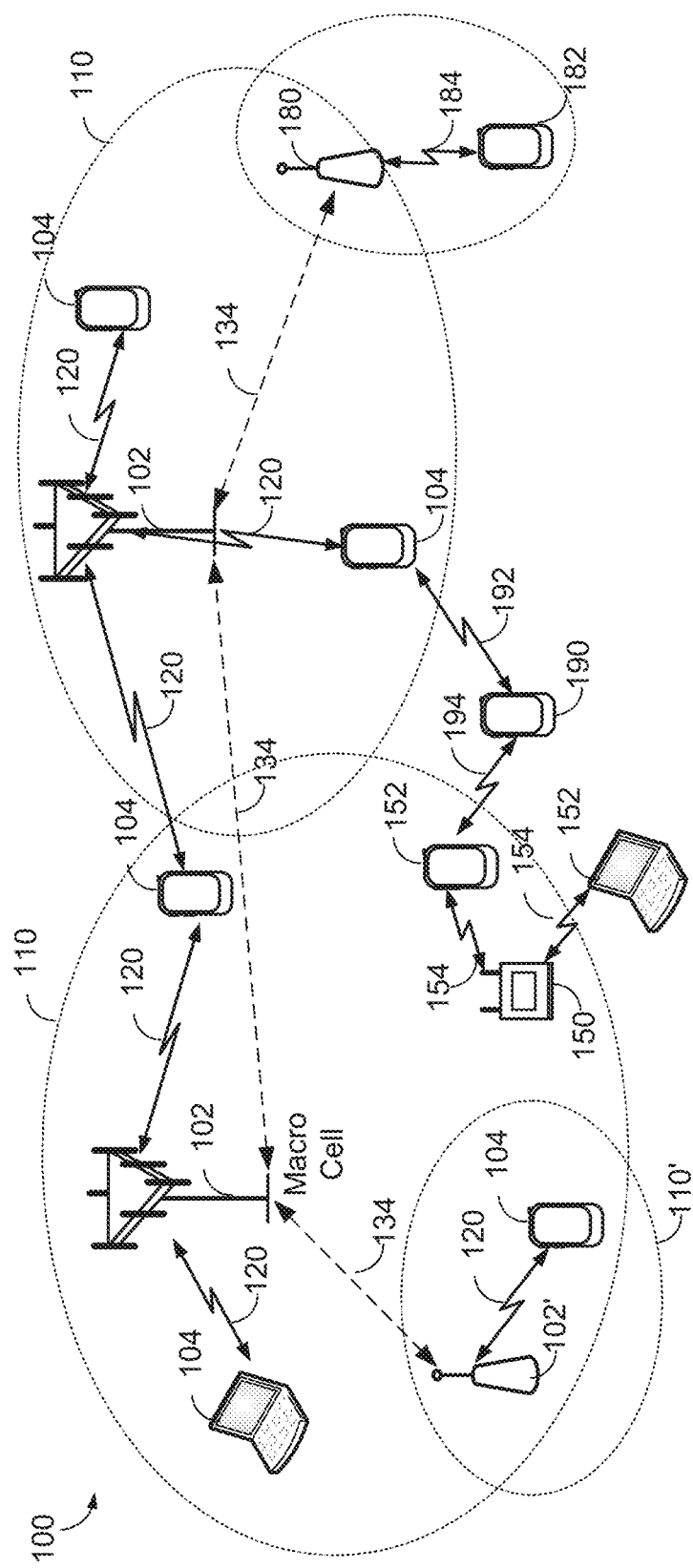
FIG. 1 illustrates an exemplary wireless communications system, according to various aspects.

Various aspects described herein generally relate to associating a downlink reference signal for positioning of a user equipment with an uplink reference signal for transmission by the user equipment. In an embodiment, a network entity (e.g., a base station, a core network component, etc.) schedules, as part of a positioning procedure for a user equipment (UE), a first set of resources for transmission of at least one downlink (DL) reference signal (RS) by at least one base station to the UE. The network entity associates the at least one DL RS with at least one uplink (UL) RS for transmission by the UE on a second set of resources to one or more base stations as part of the positioning procedure for the UE, and transmits to the UE, an indication of the association between the at least one DL RS and the at least one UL RS. The UE receives the indication along with the at least one DL RS from the at least one base station on the first set of resources. The UE transmits, to the one or more base stations in response to the received indication, the at least one UL RS on a second set of resources as part of the positioning procedure for the UE.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
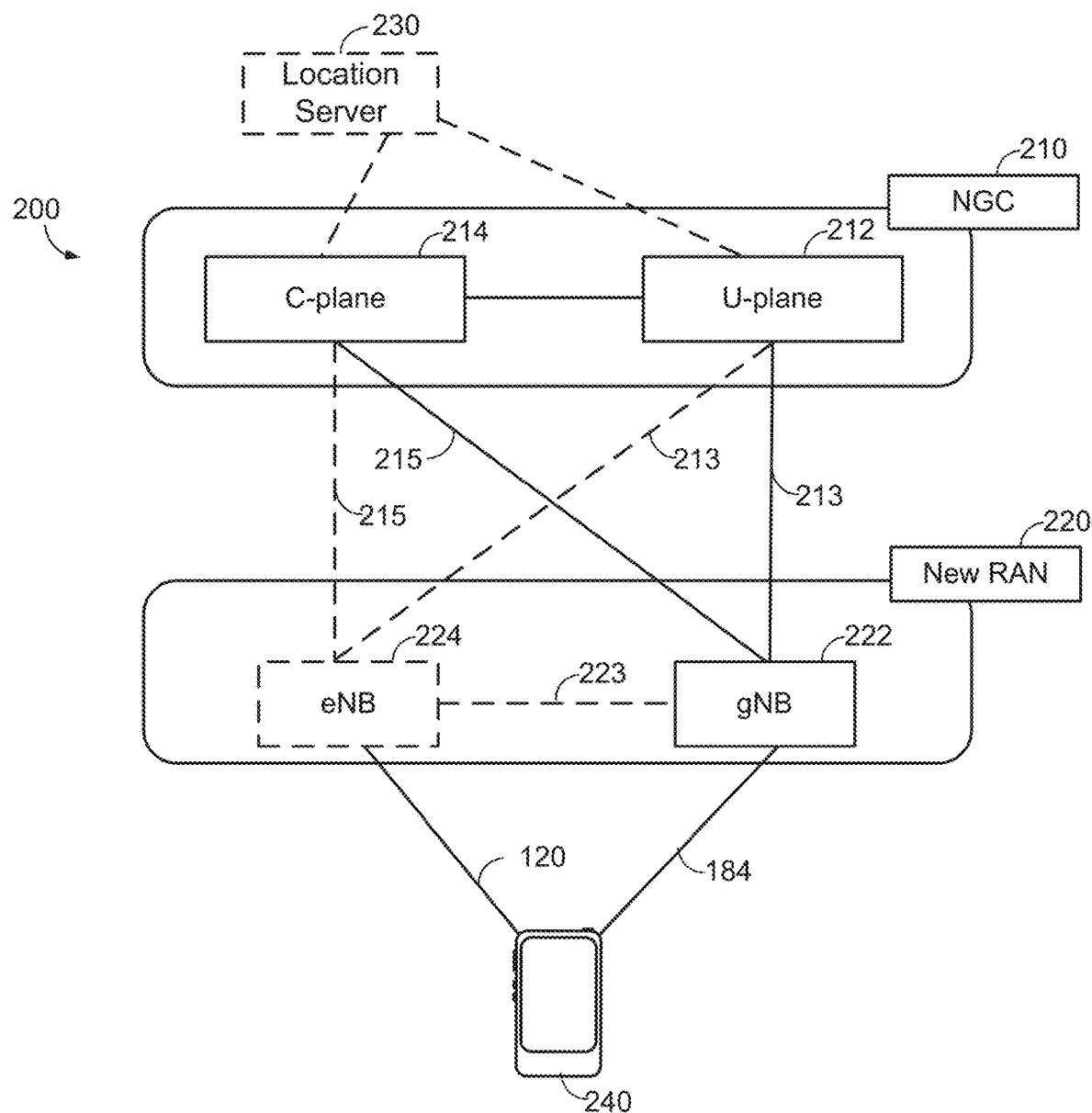
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
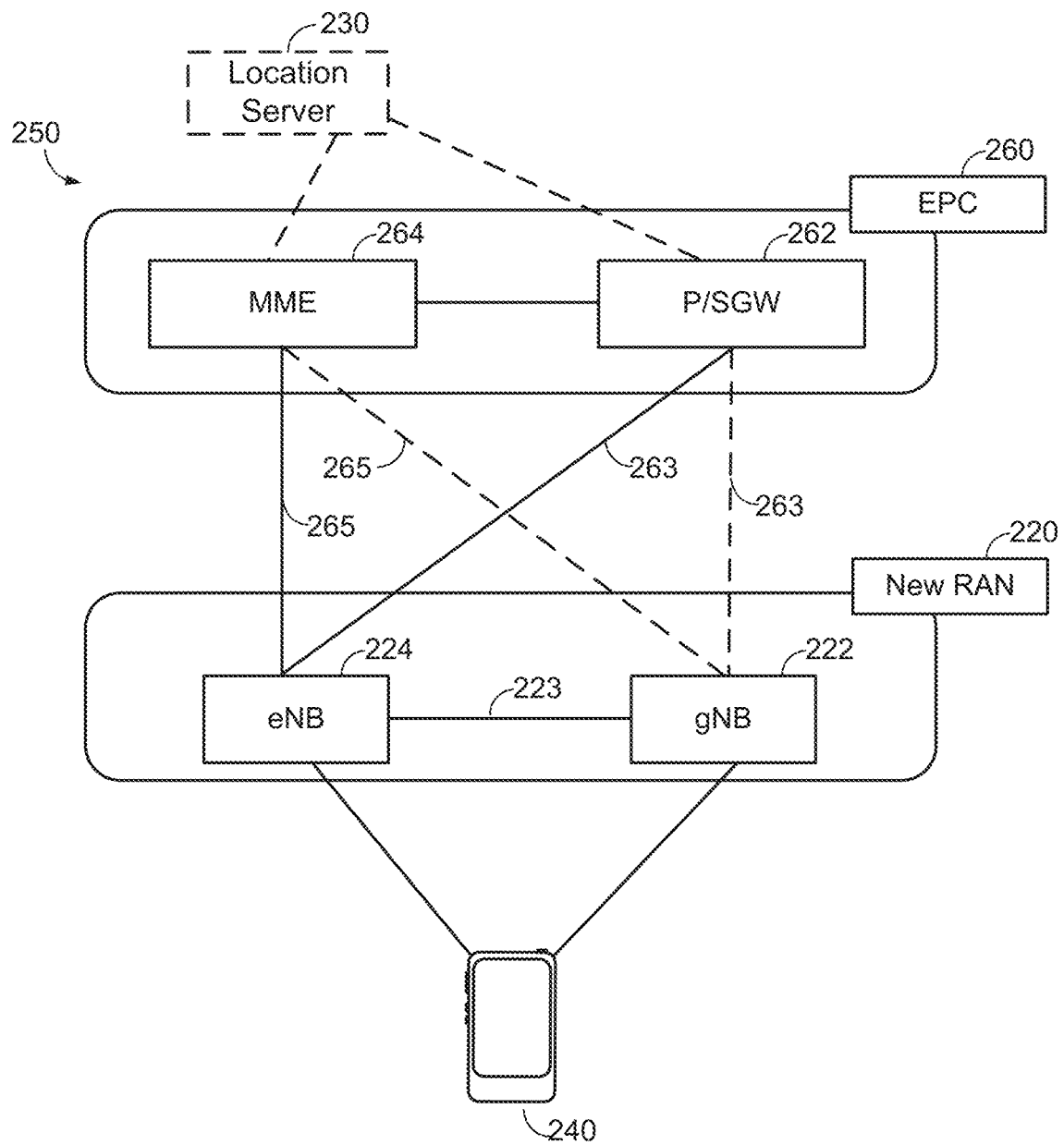

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3A:
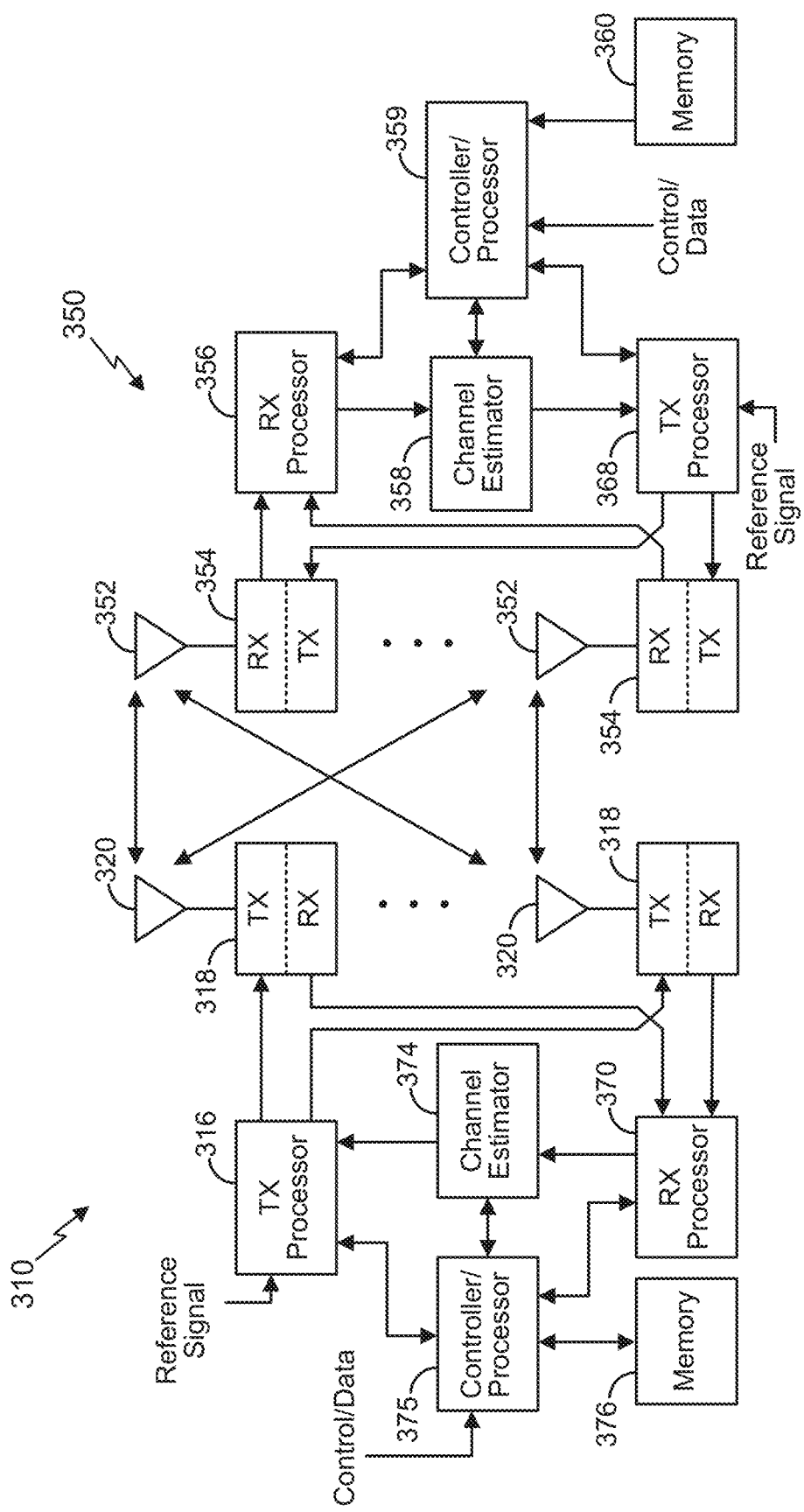
FIG. 3A illustrates an exemplary base station and an exemplary user equipment (UE) in an access network, according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 3B:
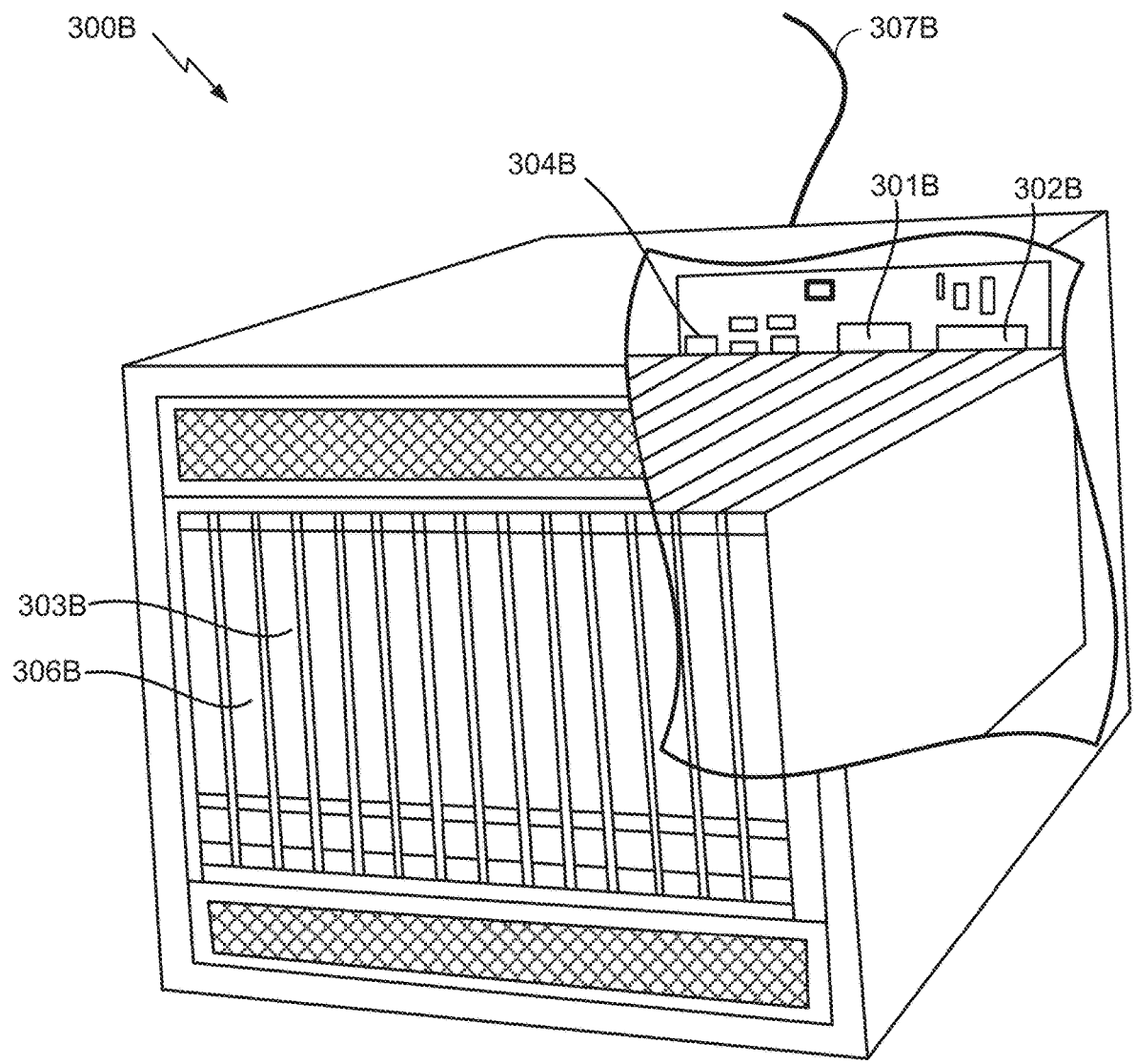
FIG. 3B illustrates an exemplary server.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
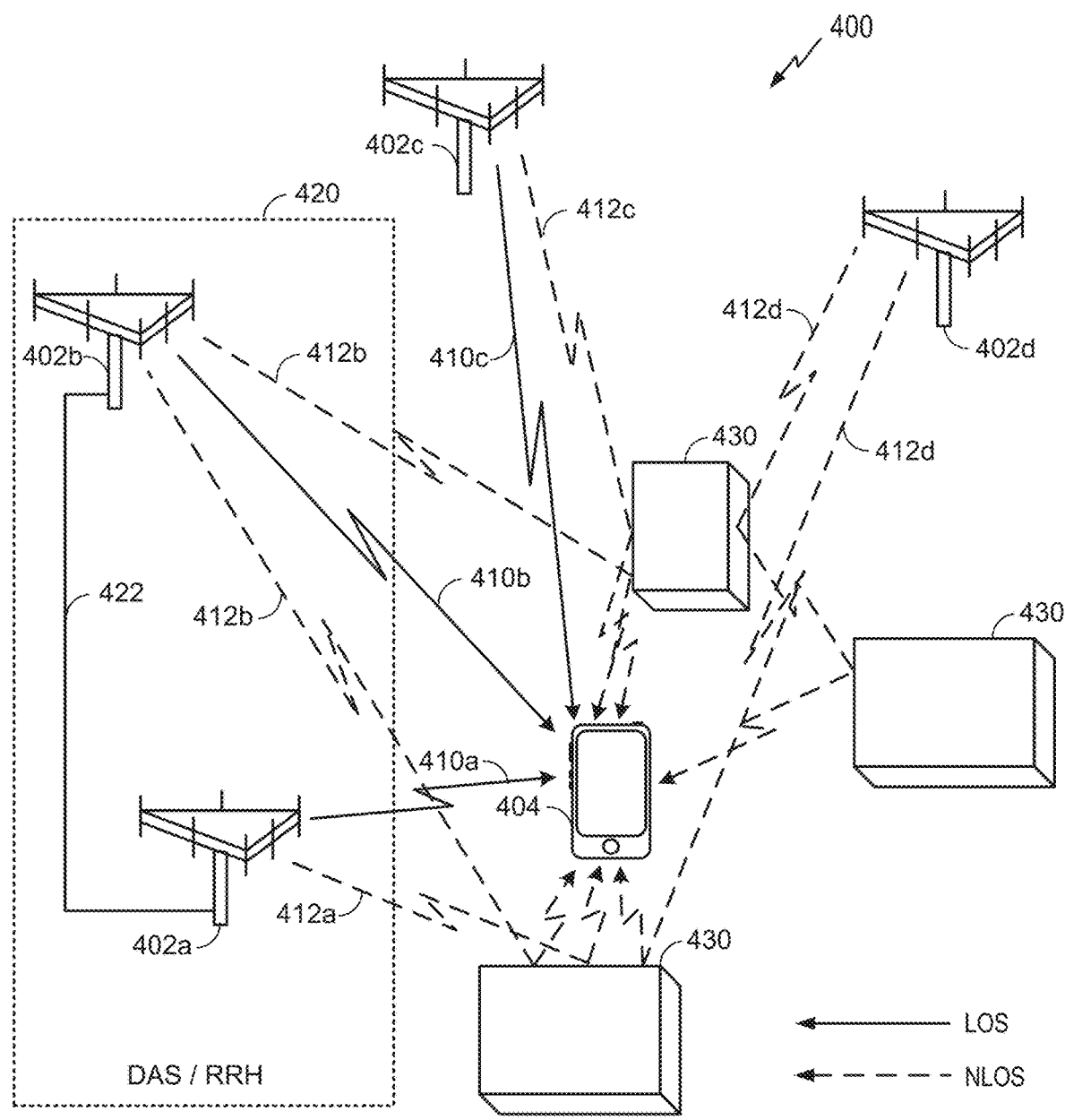
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beam.

While FIG. 4 is described in terms of transmissions from a base station to a UE, it will be appreciated that the downlink RF signal paths described with respect to FIG. 4 are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

In 5G, the RF signals described with respect to FIG. 4 may correspond to uplink and/or downlink Navigation Reference Signals (NRSs) (or positioning RSs). NRSs are ranging signals that are configured to facilitate accurate location measurements of UEs. Generally, the NRSs are desired to be robust to multipath (i.e., NLOS paths) and suitable for ranging (e.g., pseudorange measurements), Angle of Arrival (AoA) measurements, Doppler measurements for velocity estimation and navigation, and so on. NRSs may be configured with a uniform and independent signal structure. For example, NRSs may be supported by service multiplexing so as to be independent of Cycling Prefix (CP), antenna port numbers and native symbol length, and may be transmitted within a defined NRS 'envelope' that is dedicated to the NRS (e.g., no intermixing of the NRS with CRS/TRS, PSS/SSS, PBCH, etc.). The NRS may thereby provide a high level of orthogonality or isolation (e.g., time-frequency orthogonality, code isolation and/or antenna-pattern isolation) between neighboring cells (e.g., which helps to combat the near-far problem). Also, the transmission and/or reception of the NRSs may consume a relatively low amount of power at the UE.

In an example, the uplink and/or downlink NRSs (alternatively referenced below as UL or DL RSs for positioning) are measured to determine Time of Arrival (ToA) measurements. In an example, the ToA measurements may be used as part of round trip propagation time (RTT) estimation procedure(s) between the UE and one or more transmission location points of a base station, after which the calculated RTT(s) are used to derive the UE position estimate (e.g., via multilateration, such as trilateration). For example, half of the RTT may be considered representative of the propagation delay between the UE and a particular base station.

Figure 5:
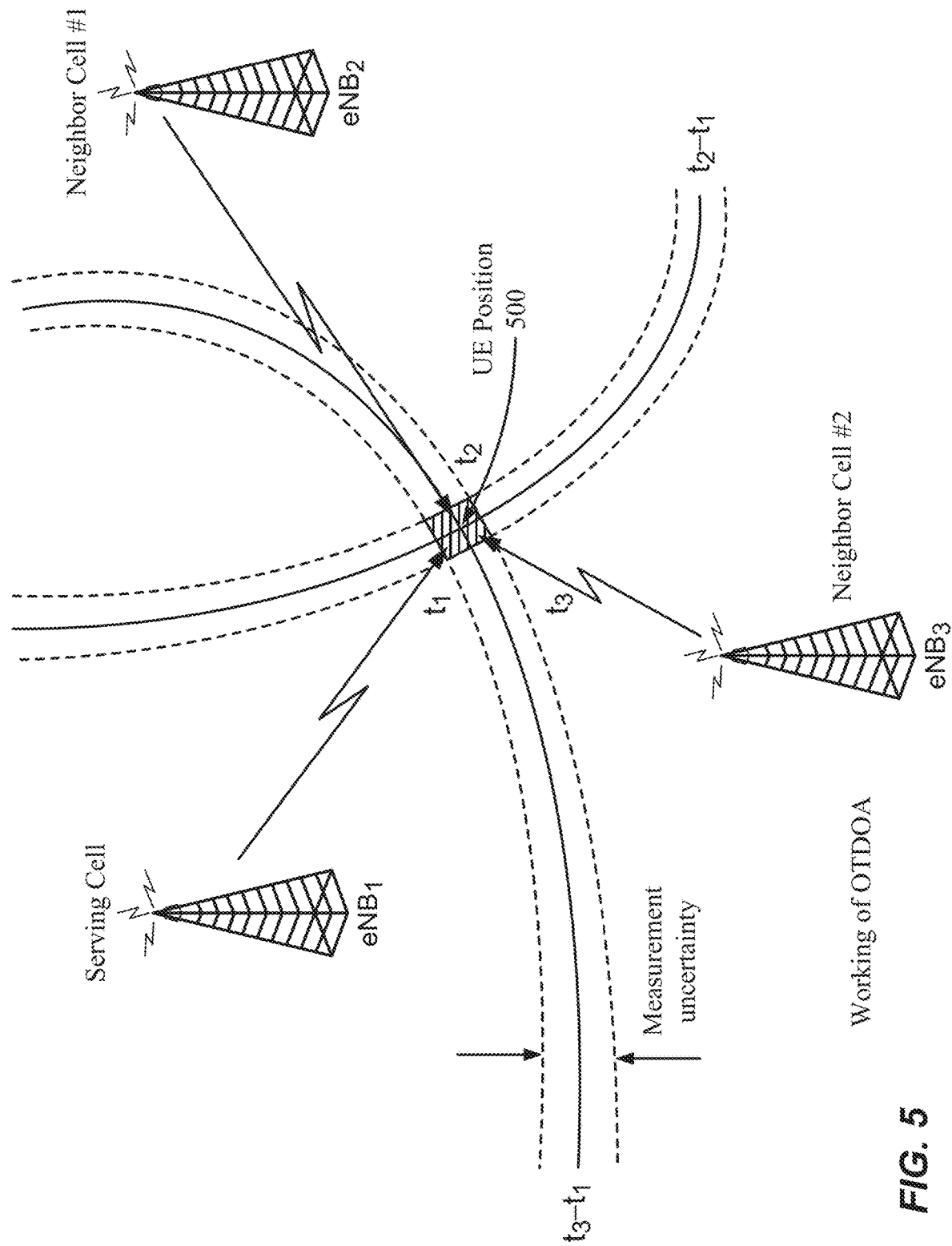
FIG. 5 illustrates a time difference of arrival (TDOA) position scheme implemented between a UE and three cells of an exemplary wireless communications system according to various aspects of the disclosure.

The mathematical model of UE positioning using a TDOA scheme will now be described with respect to FIG. 5. Referring to FIG. 5, a UE at position 500 is served by a serving cell eNB$_1$ which is a neighbor of neighboring cells eNB$_2$ and eNB$_3$. The propagation delay (or transmission time) from cells $eNB_1$, $eNB_2$ and $eNB_3$ to the UE is denoted as $t_1$, $t_2$ and $t_3$, with FIG. 5 reflecting a certain amount of measurement uncertainty in these measurements.

Referring to FIG. 5, the ToA $T_i$ at the UE for the shortest path (e.g., LOS path) from Cell i is as follows:

$$T_i = \tau_i + \frac{D_i}{c} \qquad \text{Equation 1}$$

whereby:
$\tau_i$: sum of transmission time from NodeB i, NLOS transmission time and UE timing measurement noise,
$T_i$: can be obtained from the estimation of the positioning RS or NRS,
$D_i$: Euclidean distance between Cell i with location ($q_i$) and UE with location (p),
c: the speed of light in the air 299700 km/s,
Assumes cell locations $q_i$ is known through cell information database.

The Euclidean distance D (or line distance) may further be computed in accordance with the following Equation:

$$c(T_k - \tau_k) = \qquad \text{Equation 2}$$
$$\sqrt{2}\,R\sqrt{1 - \sin(\varphi_1)\sin(\varphi_2) - \cos(\varphi_1)\cos(\varphi_2)\cos(\beta_1 - \beta_2)}$$

whereby:
D: the distance between two points on the surface of the earth,
R: the radius of the earth (e.g., 6371 km),
$\varphi_1$, $\varphi_2$: latitude (in radians) of point 1 and latitude (in radians) of point 2, respectively,
$\beta_1$, $\beta_2$: longitude (in radians) of point 1 and latitude (in radians) of point 2, respectively.

While OTDOA is illustrated in FIG. 5 in a downlink context, uplink OTDOA (U-TDOA) that relies upon UE-originated transmissions may also be implemented. These positioning schemes may be referred to collectively as TDOA positioning schemes. In U-TDOA, one or more uplink ranging signals from the UE are measured by at least three base stations to provide a two dimensional (2D) position.

In one example OTDOA implementation, the TDOAs from several base stations are measured at the UE, which then reports the measured TDOAs back to a network entity (e.g., the UE's serving cell, a location server, etc.). Through downlink network planning, the network can ensure that the UE can detect a sufficient number of base stations for the OTDOA positioning procedure. In this example, the OTDOA positioning procedure can be characterized as UE-assisted because the UE helps the network to derive the position estimate for the UE without the UE deriving its own position estimate (e.g., to save power, etc.). Rather, in an LTE-specific example, a PRS is transmitted regularly (e.g., periodically), the UE measures the PRS to compute RSTD information, and the UE reports the RSTD information back to the network. The network then derives the position estimate for the UE based on the reported RSTD information. In another example, the OTDOA positioning procedure may be UE-based instead of UE-assisted, whereby the UE measures downlink signals from its serving cell and two or more neighboring cells to determine the respective TDOA measurements, after which the UE derives its own position estimate.

By contrast, U-TDOA works on the uplink channel, and the network (e.g., a group of eNBs) performs the TDOA measurements. In an example, U-TDOA positioning schemes may be network-assisted, whereby the uplink transmissions from the UE are received and measured by highly sensitive receivers at multiple eNBs which will determine the TDOAs that can be used to derive the position estimate of the UE, after which the TDOA measurements are reported back to the UE which then derives the position estimate for the UE. Alternatively, U-TDOA positioning schemes may be network-based, whereby the network (e.g., a location server, one of the eNBs, etc.) derives the position estimate for the UE without any UE interaction beyond the transmission of the uplink signals from which the TDOAs are measured.

As will be appreciated, OTDOA-based positioning schemes rely upon measurements of RSs transmitted on downlink (DL) symbols, while U-TDOA relies upon measurements of RSs, such as sounding reference signals (SRSs), transmitted on uplink (UL) symbols. For networks operating in accordance with Time Division Duplex (TDD), traffic is generally downlink heavy so most symbols are allocated to downlink traffic. Hence, an insufficient number of UL symbols may be reserved for transmission of RSs by the UE for an accurate U-TDOA positioning procedure. In a specific example whereby U-TDOA positioning procedures are triggered opportunistically or aperiodically, it is possible that only DL symbols or only UL symbols are available in a current slot in a particular bandwidth part (BWP) or component carrier (CC). In this case, a slot containing a DL RS will not include any symbols allocated to UL transmissions. In one example, a positioning DL RS may be configured on only one BWP with a single Subcarrier Spacing (SCS) (e.g., for overhead reduction), while the UE is transmitting on some other BWP. In this case, changing the BWP to facilitate a UL RS may take a relatively long amount of time, such that only the DL RS is used for positioning. Using both the DL RS and UL RS for positioning may provide additional information that may help facilitate more accurate positioning estimates (e.g., better Angle of Departure (AoD) estimation).

Accordingly, embodiments of the disclosure are directed to establishing an association between a DL RS and an UL RS for positioning. In particular, the association can be indicated to the UE by a network entity so as to trigger the UE to transmit one or more UL RSs on resources that can be determined at the UE in accordance with a resource mapping rule.

Figure 6:
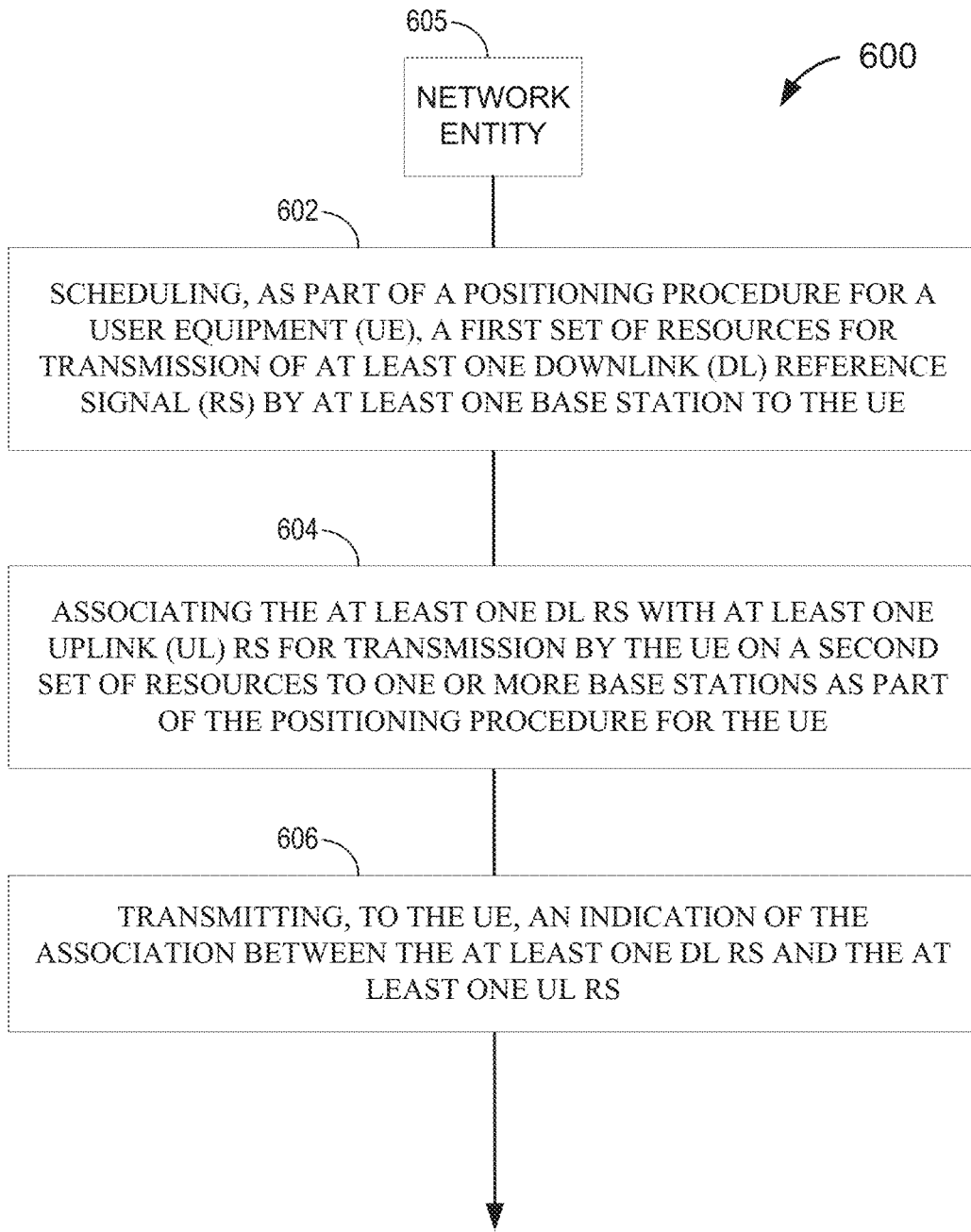
FIGS. 6-10 illustrate exemplary methods, according to various aspects.

FIG. 6 illustrates an exemplary process 600 of conveying an association between a DL RS and an UL RS according to an aspect of the disclosure. The process 600 of FIG. 6 is performed by a network entity 605. In an example, the network entity 605 may correspond to a serving eNB (e.g., gNB 222, 224, 310, etc.). Alternatively, the network entity 605 may correspond to a core network component.

At 602, the network entity 605 (e.g., controller/processor 359, processor 301B, etc.) schedules, as part of a positioning procedure for a UE, a first set of resources for transmission of at least one DL RS by at least one base station to the UE. In an example, the at least one base station may comprise a single base station associated with the position procedure, or alternatively may comprise multiple base stations associated with the positioning procedure that each transmit one or more DL RSs to be measured by the UE. In an example, the first set of resources may include a first BWP, a first CC, a first frequency range (FR1), a first SCS, and a first time behavior characteristic. For example, the first time behavior characteristic may correspond to periodic transmission of the at least one DL RS, such that the network entity 605 schedules a series of periodic DL RS transmissions at 602. In this case, the periodic DL RSs may be scheduled in accordance with a semi-persistent scheduling (SPS) protocol. Alternatively, the first time behavior characteristic may correspond to aperiodic or opportunistic transmission of one particular DL RS.

At 604, the network entity 605 (e.g., controller/processor 359, processor 301B, etc.) associates the at least one DL RS with at least one uplink (UL) RS for transmission by the UE on a second set of resources to one or more base stations as part of the positioning procedure for the UE. In an example, the one or more base stations may include a single base station associated with the positioning procedure that measures the UL RS, or alternatively may comprise multiple base stations associated with the positioning procedure that each measure the at least one UL RS. In one example, the at least one BS scheduled to transmit the DL RS(s) at 602 may be the same as the one or more BSs to which the UL RS(s) are transmitted from the UE. In an alternative example, the at least one BS and the one or more BS may correspond to different groupings of BSs. For example, a single base station may be transmit the DL RS on the first set of resources, while multiple base station monitor the UL RS(s) transmitted from the UE.

At 606, the network entity 605 (e.g., antenna(s) 320, transmitter(s) 318, and/or TX processor 316, network access ports 304B) transmits, to the UE, an indication of the association between the at least one DL RS and the at least one UL RS. In an example, if the network entity 605 corresponds to a base station (e.g., serving eNB), then the network entity 605 also transmits the at least one DL RS to the UE. In an example, the indication may be contained in an RRC configuration of the at least one DL RS in one or more embodiments.

Still referring to 606 of FIG. 6, it is possible that the at least one DL RS may include multiple DL RSs from different base stations in certain embodiments. In this case, the indication sent at 606 does not necessarily identify any particular DL RS or its associated resources among these multiple DL RSs. Rather, the indication can be as simple as a single bit that indicates the presence or absence of any DL RS for positioning. Hence, the association of the UL RS(s) to the DL RS(s) can be more broadly characterized as an association to between the UL RS(s) and resources known to carry at least one DL RS for positioning, without requiring the association to be indicated via an express designation of a specific DL RS or DL RS-specific resource(s).

Referring to FIGS. 604-606, in an example, the second set of resources for transmission of the UL RS(s) may be the same or different than the first set of resources on which the DL RS(s) are transmitted. For example, the second set of resources may include the first BWP or a second BWP, the first CC or a second CC, the first frequency range (FR1) or a second frequency range (FR2), the first SCS or a second SCS, the first time behavior characteristic or a second time behavior characteristic, or any combination thereof.

Referring to 604-606, in one example, the association may be triggered in a selective manner for less than all DL RSs. For example, in an example where the DL RS is transmitted periodically, the UL RS may be associated with designated DL RSs only when a more precise position estimate for the UE is desired. In this case, the designated DL RSs can be configured (e.g., with a particular bit setting) to indicate the association at 606, as discussed in more detail below with respect to FIG. 10. In an alternative example, the association may be implemented in advance for all positioning-related DL RS transmissions, as discussed in more detail below with respect to FIGS. 8-9. In this case, the association can be indicated to the UE in advance of the positioning-related DL RS transmission(s), with the UE then being expected to interpret each positioning-related DL RS as being associated with a UL RS.

Figure 7:
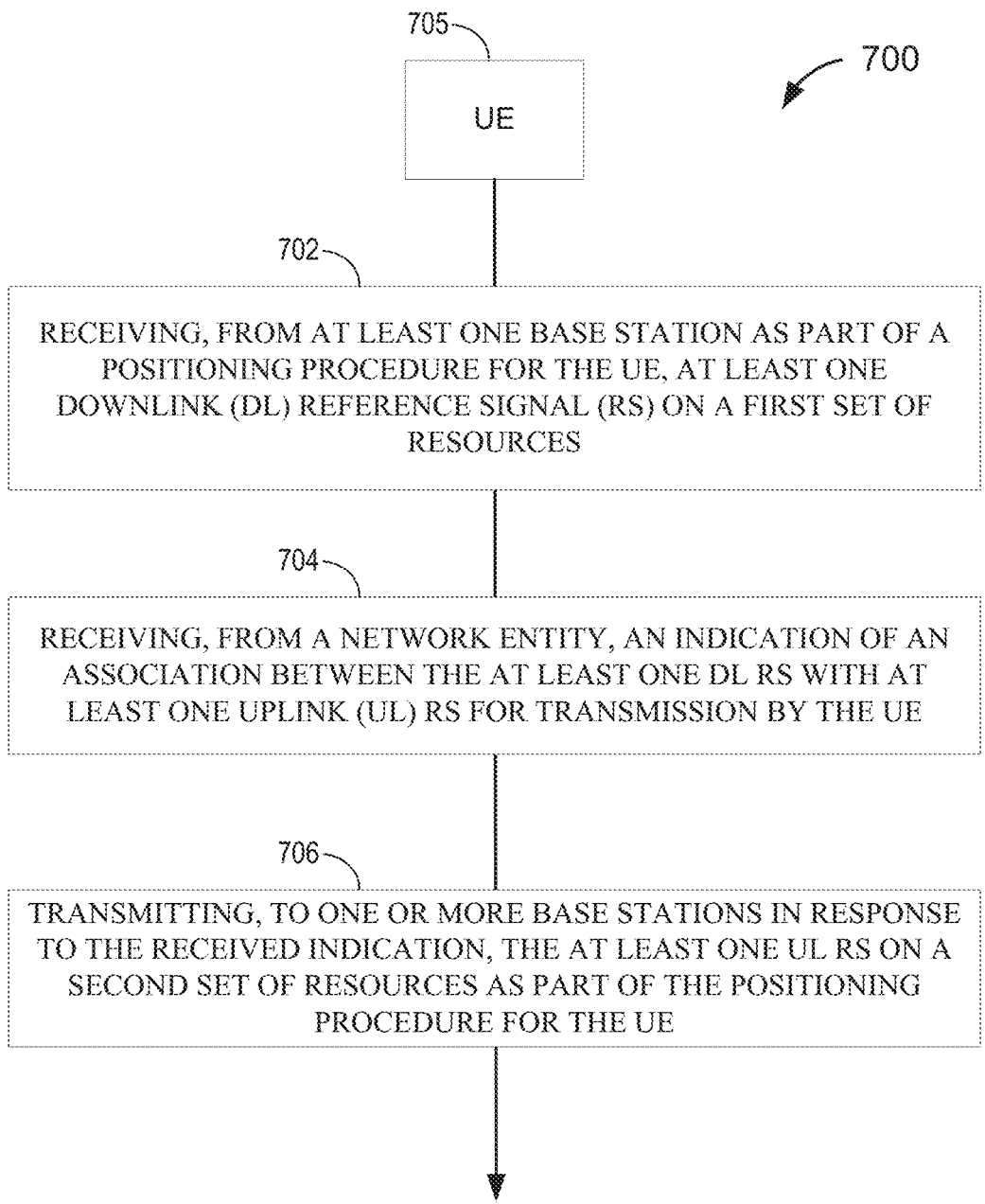

FIG. 7 illustrates an exemplary process 700 of triggering transmission of at least one UL RS based on an association between a DL RS and an UL RS according to an aspect of the disclosure. The process 700 of FIG. 7 is performed by a UE 705, which may correspond to any of the above-noted UEs (e.g., UE 240, 350, etc.).

At 702, the UE 705 (e.g., antenna(s) 352, receiver(s) 354, and/or RX processor 356) receives, from at least one base station (e.g., base station 310) as part of a positioning procedure for the UE 705, at least one downlink (DL) reference signal (RS) on a first set of resources. In an example, the at least one base station may comprise a single base station associated with the position procedure, or alternatively may comprise multiple base stations associated with the positioning procedure that each transmit one or more DL RSs to be measured by the UE 705.

At 704, the UE 705 (e.g., antenna(s) 352, receiver(s) 354, and/or RX processor 356) receives, from a network entity (e.g., network entity 605 of FIG. 6), an indication of an association between the at least one DL RS with at least one uplink (UL) RS for transmission by the UE 705. In an example, the network entity from which the indication is received may correspond to one of the base station(s) from which the DL RS(s) are received, in which case the indication at 704 may be piggy-backed onto the transmission of the DL RS(s) at 702. Alternatively, the network entity and base station(s) may correspond to different entities. In another example, the indication at 704 may also be kept separate from the transmission of the DL RS(s) at 702 even if the network entity corresponds to one of the base station(s). In an example, the indication may be contained in an RRC configuration of the at least one DL RS and/or the at least one UL RS in one or more embodiments.

At 706, the UE 705 (e.g., antenna(s) 352, transmitter(s) 354, and/or TX processor 368) transmits, to one or more base stations in response to the received indication, the at least one UL RS on a second set of resources as part of the positioning procedure for the UE. 705 In an example, the at least one UL RS may correspond to at least one SRS. In an alternative example, the at least one UL RS may correspond to at least one DeModulation Reference Signal (DMRS) on the Physical Uplink Shared Channel (PUSCH). In a further example, the one or more base stations may include a single base station associated with the positioning procedure that measures the UL RS, or alternatively may comprise multiple base stations associated with the positioning procedure that each measure the at least one UL RS. In one example, the at least one BS transmitting the DL RS(s) at 702 may be the same as the one or more BSs to which the UL RS(s) are transmitted from the UE 705 at 706. In an alternative example, the at least one BS and the one or more BS may correspond to different groupings of BSs. For example, a single base station may be transmit the DL RS on the first set of resources, while multiple base station monitor the UL RS(s) transmitted from the UE 705.

Figure 8:
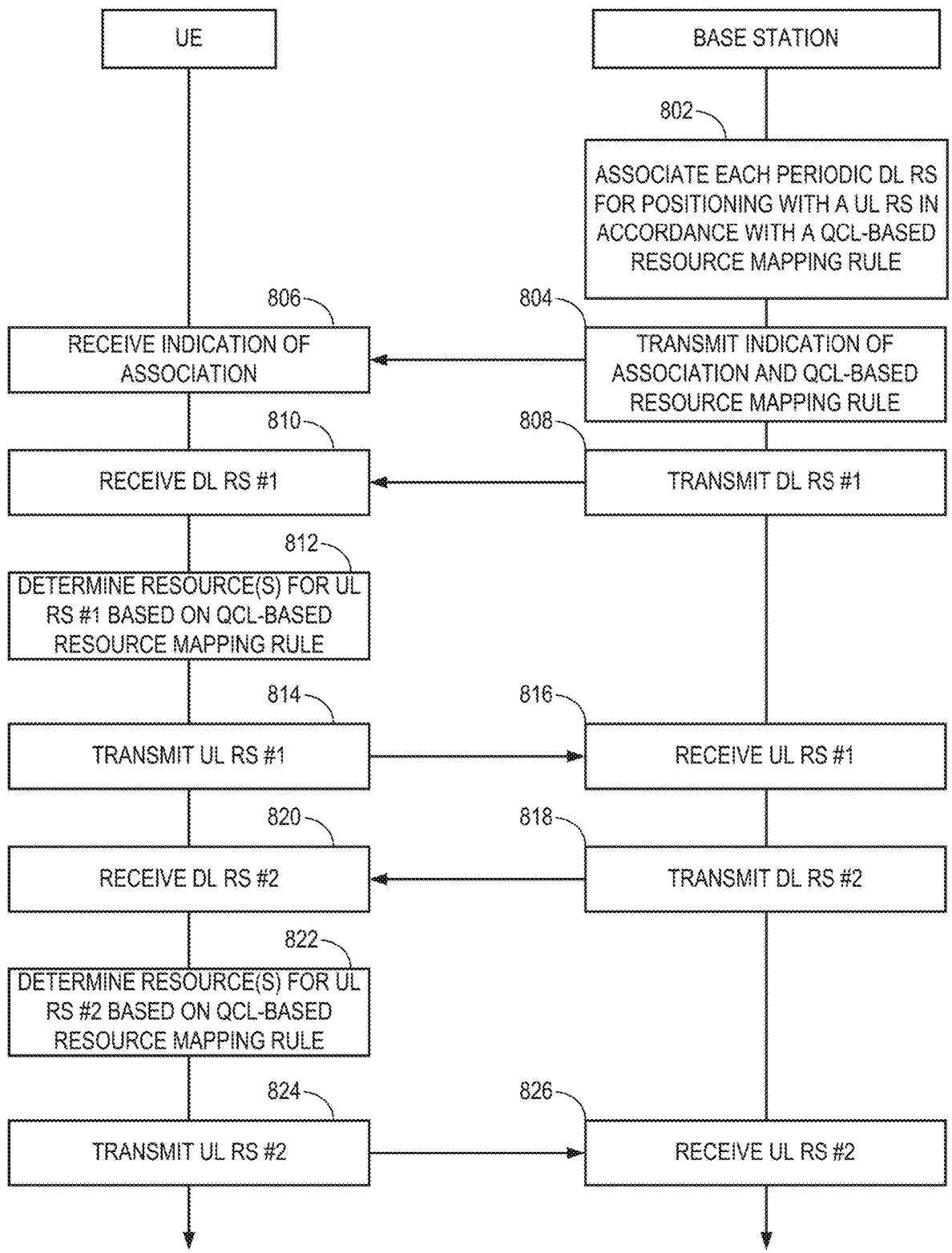

FIG. 8 illustrates an example implementation of the processes of FIGS. 6-7 in accordance with an embodiment of the disclosure. For convenience of explanation, the process of FIG. 8 is described with respect to a single base station, as if only that single base station transmits the DL RS to the UE, and the UE in turn transmits the UL RS only to that single base station. However, as noted above, multiple base stations can transmit the DL RS(s) to the UE in other embodiments, and likewise multiple base stations can measure the UL RS(s) from the UE in other embodiments. Further, in the embodiment of FIG. 8, it is assumed that the network entity 605 corresponds to the base station.

At 802, the base station determines to associate each periodic DL RS for positioning with a UL RS in accordance with a quasi co-location (QCL)-based mapping rule. For example, antenna ports are considered quasi co-located when they are in-fact be co-located (i.e., transmitted from the same transmission point, antenna array, or antenna) or when the antenna ports are arranged in different TPs with similar channel properties. Accordingly, the QCL-based mapping rule may map the resource that transports the DL RS to a QCL-associated resource (e.g., a resource of a QCL antenna port) for transmission of the UL RS. In an example, the QCL association may be a reference-spatial QCL-association, a delay spread QCL association, an average delay QCL association, a doppler spread QCL association, a doppler shift QCL association, or a combination of them. At 804, the base station transmits an indication of the association along with the QCL-based resource mapping rule to the UE, which is received at 806.

Referring to FIG. 8, at some later point in time, at 808, the base station transmits DL RS #1 to the UE, which is received at 810. In the embodiment of FIG. 8, DL RS #1 corresponds to one of a plurality of periodic DL RS #1 for positioning from the base station. At 812, because the UE was instructed to associate each periodic DL RS for positioning with a UL RS via the indication at 804-806, the UE determines resource(s) for UL RS #1 based on the QCL-based resource mapping rule. In an example, the specific resource(s) determined at 812 may further be based on previous symbol assignments to the UE. For example, DL RS #1 may be implemented as a broadcast message received by multiple UEs, so UE-specific symbol assignments may be pre-established to ensure that UEs responding to DL RS #1 do not collide with each other. At 814, the UE transmits UL RS #1 on the resource(s) determined at 812, which is received by the base station at 816.

At some later point in time, at 818, the base station transmits DL RS #2 to the UE, which is received at 820. In the embodiment of FIG. 8, DL RS #2 corresponds to a next periodic instance of the DL RS after DL RS #1. At 822, because the UE was instructed to associate each periodic DL RS for positioning with a UL RS via the indication at 804-806, the UE determines resource(s) for UL RS #2 at 822 based on the QCL-based resource mapping rule (e.g., as in 812). At 824, the UE transmits UL RS #2 on the resource(s) determined at 822, which is received by the base station at 826.

Figure 9:
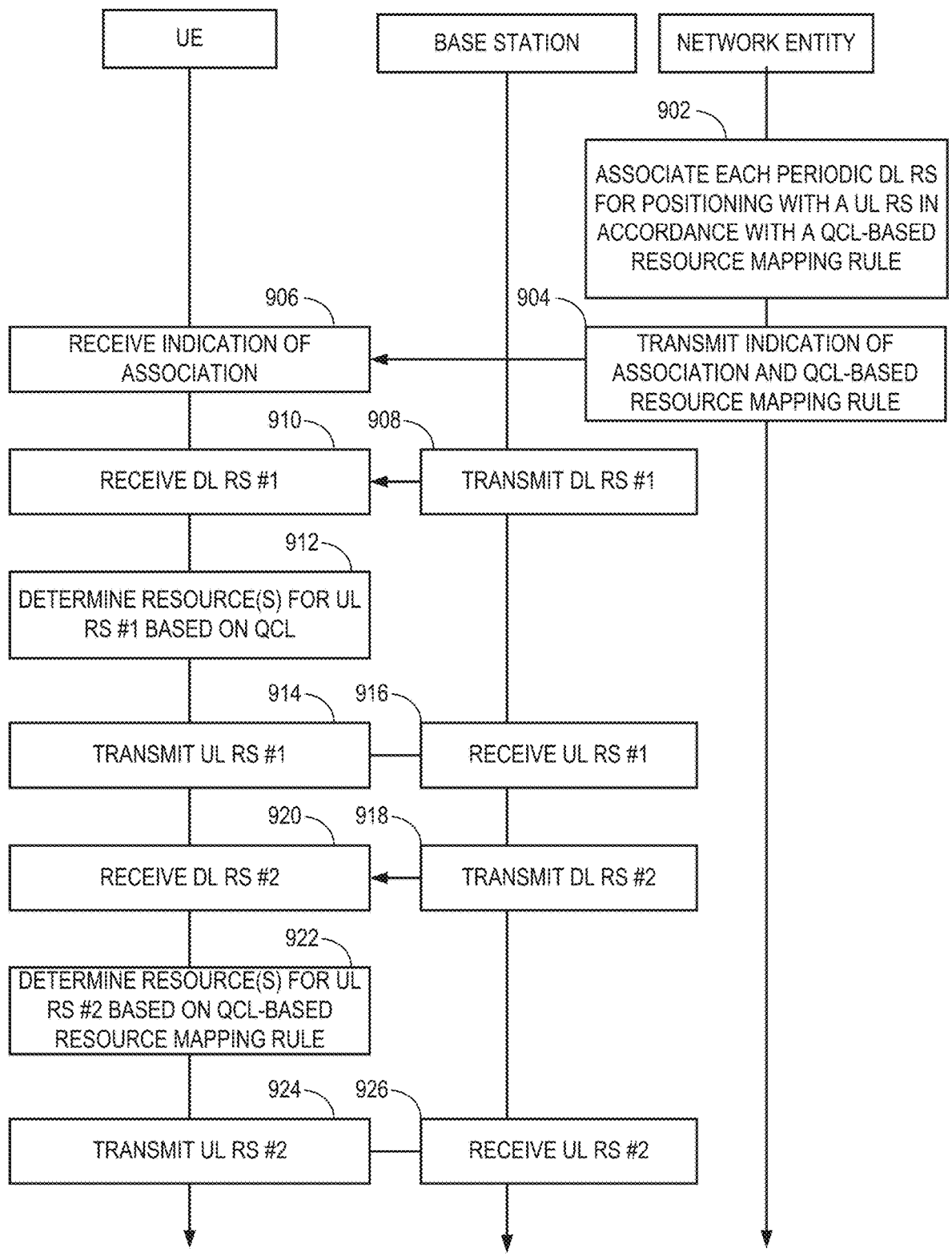

FIG. 9 illustrates another example implementation of the processes of FIGS. 6-7 in accordance with an embodiment of the disclosure. Similar to FIG. 8 and for convenience of explanation, the process of FIG. 9 is described with respect to a single base station, as if only that single base station transmits the DL RS to the UE, and the UE in turn transmits the UL RS only to that single base station. However, as noted above, multiple base stations can transmit the DL RS(s) to the UE in other embodiments, and likewise multiple base stations can measure the UL RS(s) from the UE in other embodiments. In the embodiment of FIG. 9, it is assumed that the network entity 605 is distinct from the base station. For example, the network entity 605 may correspond to a different base station (e.g., a serving base station in contrast to a neighboring base station), a core network component, etc. Referring to FIG. 9, 902-906 correspond to 802-806 of FIG. 8 except that 902-906 are performed by a network entity that is separate from the base station. 908-926 correspond to 808-826, respectively, as described above with respect to FIG. 8, and as such will not be described further for the sake of brevity.

Figure 10:
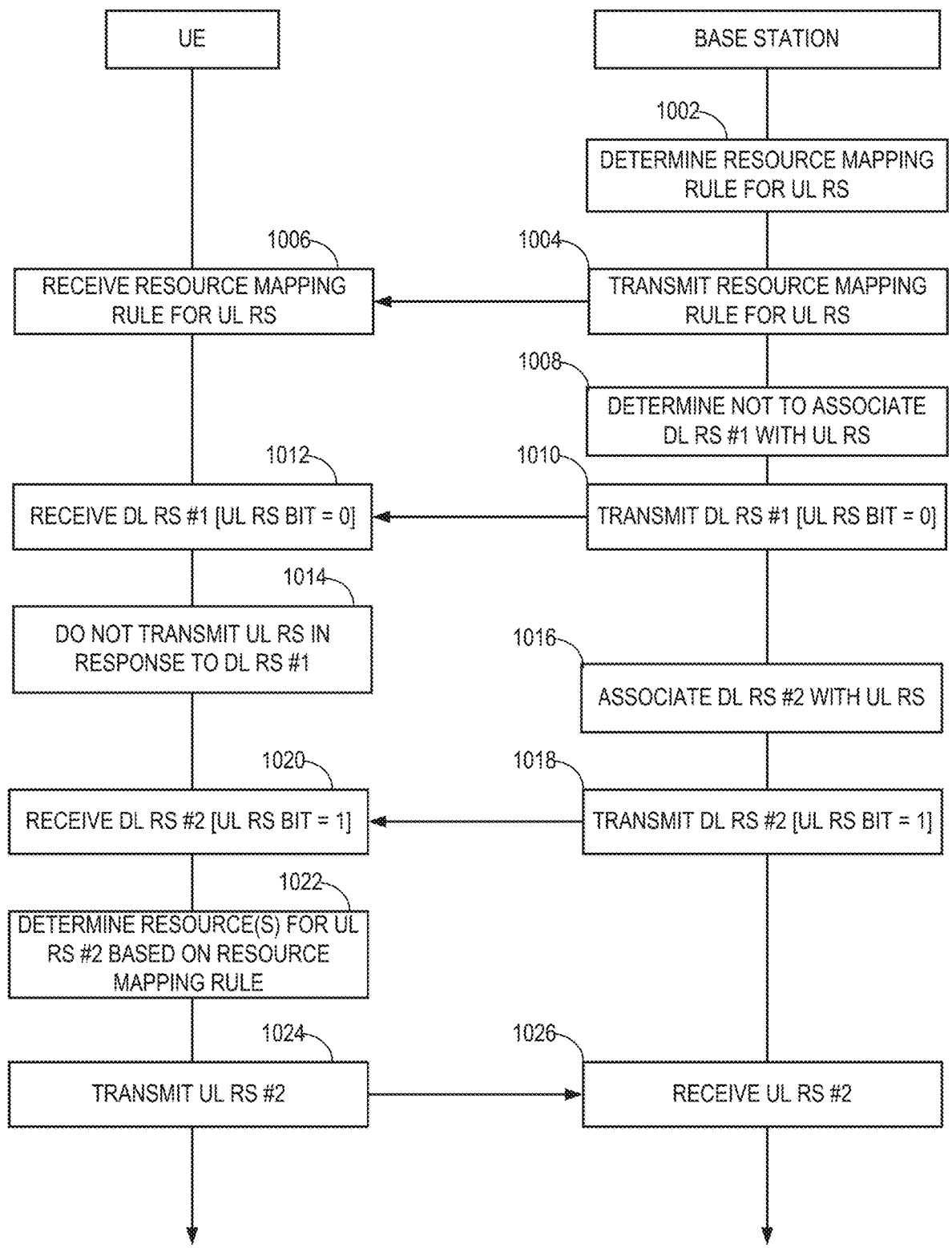

FIG. 10 illustrates another example implementation of the processes of FIGS. 6-7 in accordance with an embodiment of the disclosure. Similar to FIGS. 8 and 9, and for convenience of explanation, the process of FIG. 10 is described with respect to a single base station, as if only that single base station transmits the DL RS to the UE, and the UE in turn transmits the UL RS only to that single base station. However, as noted above, multiple base stations can transmit the DL RS(s) to the UE in other embodiments, and likewise multiple base stations can measure the UL RS(s) from the UE in other embodiments. In the embodiment of FIG. 10, it is assumed that the network entity 605 corresponds to the base station. However, similar to FIG. 9, the network entity 605 could correspond to a separate network entity (e.g., another base station such as a serving base station of the UE if the base station is a neighboring base station, or a core network component), in which case 1002-1006 would be performed by the separate network entity instead of the base station itself.

Referring to FIG. 10, at 1002, the base station determines a resource mapping rule for UL RS. At 1004, the base station transmits the resource mapping rule to the UE, which is received at 1006. The resource mapping rule determined at 1002 may correspond to a QCL-based resource mapping rule as described above with respect to FIGS. 8-9. In another example, the resource mapping rule determined at 1002 may be configured to map resources for both the DL RS and an associated UL RS onto the same slot.

Still referring to 1002 of FIG. 10, in NR Rel-15, the only SRS resource that can be triggered through the carrier switching procedure as those that are tagged as "antenna-switching" as a use-case. In an embodiment, SRS resource set for positioning (i.e., the resources allocated to the UL RS) which are associated with a DL RS for positioning can be triggered through the carrier switching procedure if a carrier does not have PUSCH/PUCCH configured. In other words, a SRS resource set for positioning can be triggered to be transmitted on a carrier without PUSCH/PUCCH configured through the SRS carrier switching procedure. In this way, a UE may know that an SRS resource set is configured for positioning through the implicit association with a DL RS for positioning.

Still referring to 1002 of FIG. 10, in another example, the resource mapping rule may allocate additional or supplemental resources to the transmission of a UL RS associated with a DL RS for positioning as compared to resources allocated to other UL RSs that are not associated with a DL RS for positioning under NR Rel-15. In an NR-specific example, the additional or supplemental resources allocated to the UL RS in accordance with the resource mapping rule determined at 1002 may include any of the following:

Example #1

Assume that Comb-N denotes a subcarrier skipping pattern in the frequency domain, whereby N=1 means transmission occurs at each subcarrier (no skips), N=2 means transmission occurs at every other subcarrier (every $2^{nd}$ subcarrier is skipped), N=3 means transmission occurs at every third subcarrier (every $3^{rd}$ subcarrier is skipped), and so on. If the SRS resource for positioning uses Comb-N where N>1 (e.g., Comb-2, Comb-4, etc.) and is configured with multiple back-to-back symbols, in an embodiment, subcarrier hopping is used to ensure that all subcarriers have been sounded (e.g., similar to Comb-1, even though Comb-1 is not actually being used). In other words, the UL RS associated with a DL RS for positioning skips fewer subcarriers relative to one or more other UL RSs that are not associated with a DL RS for positioning via subcarrier hopping.

Example #2

Comb-1 for an SRS resource is allowed only if an association with a DL RS is indicated, or if the SRS is otherwise denoted as being an SRS for positioning. Otherwise, the legacy (NR Rel-15) are used. In other words, the UL RS associated with a DL RS for positioning skips fewer subcarriers relative to one or more other UL RSs that are not associated with a DL RS for positioning via the use of Comb-1. Alternatively, a lower value of N for Comb-N can be used without Comb-1 being used (e.g., legacy NR Rel-15 may specify Comb-4 for the SRS, whereas either Comb-1, Comb-2 or Comb-3 can be used for the UL RS that is indicated as associated with a DL RS for positioning). So, a more robust subcarrier skipping pattern can be used even if Comb-1 is not available, and/or Example #3

When the UE is configured with multiple back-to-back symbols for an SRS resource for positioning, the UE transmits the SRS resources with a specified (or configured) delta in the AoD, so the gNB may get extra information on estimating the AoD. In other words, the UL RS associated with a DL RS for positioning is swept along a wider AoD relative to one or more other UL RSs that are not associated with a DL RS for positioning. In an example, the AoD delta may be defined in degrees (e.g., 0 degrees, 5 degrees) or radians (e.g., pi/6) as part of the azimuth or altitude (or elevation) angles that the UE should use when transmitting the UL RS. Hence, the resource mapping rule may allocate the second set of resources based on a specified delta in an angle of departure (AoD) according to the QCL association between the first and second sets of resources, such that the resource need not be limited to time and/or frequency but can encompass spatial resources as well.

In the embodiment of FIG. 10, an association between a DL RS and UL RS is indicated via a UL RS bit contained in the DL RS. In an example, the UL RS bit may be part of a Downlink Control Information (DCI) field of the DL RS so that the DL RS and UL RS are jointly triggered. For example, the DL RS may configure the UL RS bit in a specific DCI format, such as a fallback DCI format (e.g., DCI format 0_0 and 1_0 in NR Rel-15) or a DCI in the common search space. In another example, for DCIs in the UE-specific search space, joint triggering may not be needed because the DL RS for positioning and the associated UL RS for positioning are typically used to signal the reception (or transmission) from multiple UEs.

Referring to FIG. 10, at some later point in time, at 1008, the base station determines not to associate DL RS #1 with a UL RS. At 1010, the base station transmits DL RS #1 [UL RS bit=0] to the UE, which is received at 1012. At 1014, the UE determines that DL RS #1 is not associated with a UL RS based on the UL RS bit being set to 0, and thereby does not transmit a UL RS in response to DL RS #1.

Referring to FIG. 10, at some later point in time, at 1016, the base station determines to associate DL RS #2 with a UL RS. At 1018, the base station transmits DL RS #2 [UL RS bit=1] to the UE, which is received at 1020. At 1022, the UE determines that DL RS #2 is associated with a UL RS based on the UL RS bit being set to 1, and thereby determines the resource(s) for transmission of UL RS #2 based on the resource mapping rule. At 1024, the UE transmits UL RS #2 on the resource(s) determined at 1022, which is received by the base station at 1026. In an example, the DL RSs #1 and #2 may correspond to periodic DL RS transmissions (e.g., semi-persistently scheduled) or aperiodic DL RS transmissions.

While the embodiments of FIGS. 6-10 are described generally with respect to a UL RS being associated with a DL RS for positioning, the UL RS can optionally be used for one or more functions in addition to positioning. For example, the UL RS may be "codebook-based" function or "non-codebook-based" function, the UL RS may be used for a UL beam management function, an antenna-switching function, and so on.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD- ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a network entity, comprising:
   scheduling, as part of a positioning procedure for a user equipment (UE), a first set of resources for transmission of at least one downlink (DL) reference signal (RS) by at least one base station to the UE;
   associating the at least one DL RS with at least one uplink (UL) RS for transmission by the UE on a second set of resources to one or more base stations as part of the positioning procedure for the UE; and
   transmitting, to the UE, an indication of the association between the at least one DL RS and the at least one UL RS.

2. The method of claim 1,
   wherein the at least one base station includes a single base station associated with the positioning procedure, or
   wherein the at least one base station includes multiple base stations associated with the positioning procedure that each transmit one or more DL RSs to be measured by the UE.

3. The method of claim 1, wherein the indication indicates the association without a particular DL RS being specified.

4. The method of claim 1,
   wherein the indication is contained in a radio resource control (RRC) configuration of the at least one DL RS, or
   wherein the indication is indicated via a bit in a Downlink Control Information (DCI) field, or
   wherein the indication is contained in an RRC configuration of the at least one UL RS.

5. The method of claim 1, further comprising:
   determining a resource mapping rule of the second set of resources; and
   transmitting the resource mapping rule to the UE.

6. The method of claim 5, wherein the resource mapping rule is transmitted to the UE before the at least one DL RS is transmitted to the UE.

7. The method of claim 5, wherein the resource mapping rule is based on a quasi co-location (QCL) association between the first and second sets of resources.

8. The method of claim 7, wherein the resource mapping rule allocates the second set of resources based on a specified delta in an angle of departure (AoD) according to the QCL association between the first and second sets of resources.

9. The method of claim 5,
   wherein the resource mapping rule maps the second set of resources onto the same slot as the first set of resources, or
   wherein the resource mapping rule allocates the second set of resources via a carrier switching procedure irrespective of whether the allocation of the second set of resources is tagged as an antenna-switching use case.

10. The method of claim 5, wherein the resource mapping rule allocates supplemental resources to the second set of resources that are not allocated to one or more other UL RSs that lack an association to a DL RS for positioning.

11. The method of claim 10,
    wherein the supplemental resources include one or more additional subcarriers via setting a subcarrier skipping pattern so as not to skip any subcarriers in a frequency domain, or
    wherein the supplemental resources include one or more additional subcarriers via subcarrier hopping, or
    wherein the supplemental resources include an Angle of Departure (AoD) configuration, or
    any combination thereof.

12. The method of claim 1,
    wherein the at least one DL RS includes a plurality of periodically or semi-persistently transmitted DL RSs, or
    wherein the at least one DL RS includes one or more DL RSs that are transmitted aperiodically.

13. The method of claim 1,
wherein the first set of resources includes a first bandwidth part (BWP), and the second set of resources includes the first BWP or a second BWP that is different than the first BWP, or
wherein the first set of resources includes a first component carrier (CC), and the second set of resources includes the first CC or a second CC that is different than the first CC, or
wherein the first set of resources includes a first frequency range, and the second set of resources includes the first frequency range or a second frequency range that is different than the first frequency range, or
wherein the first set of resources includes a first subcarrier spacing (SCS), and the second set of resources includes the first SCS or a second SCS that is different than the first SCS, or
wherein the first set of resources includes a first time behavior characteristic, and the second set of resources includes the first time behavior characteristic or a second time behavior characteristic that is different than the first time behavior characteristic, or
wherein the first time behavior characteristic corresponds to periodic transmission and the second time behavior characteristic corresponds to aperiodic transmission, or
wherein the at least one UL RS corresponds to at least one Sounding Reference Signal (SRS) or at least one DeModulation Reference Signal (DMRS) on a Physical Uplink Shared Channel (PUSCH), or
any combination thereof.

14. The method of claim 1, wherein the at least one UL RS is configured for at least one function separate from the positioning procedure.

15. The method of claim 14, wherein the at least one function is a codebook-based function, a non-codebook-based function, an uplink beam management function, or an antenna-switching function.

16. A method of operating a user equipment (UE), comprising:
receiving, from at least one base station as part of a positioning procedure for the UE, at least one downlink (DL) reference signal (RS) on a first set of resources;
receiving, from a network entity, an indication of an association between the at least one DL RS with at least one uplink (UL) RS for transmission by the UE; and
transmitting, to one or more base stations in response to the received indication, the at least one UL RS on a second set of resources as part of the positioning procedure for the UE.

17. The method of claim 16, wherein the indication indicates the association without a particular DL RS being specified.

18. The method of claim 16,
wherein the indication is contained in a radio resource control (RRC) configuration of the at least one DL RS, or
wherein the indication is indicated via a bit in a Downlink Control Information (DCI) field, or
wherein the indication is contained in an RRC configuration of the at least one UL RS.

19. The method of claim 16, further comprising:
receiving a resource mapping rule before the at least one DL RS is transmitted to the UE.

20. The method of claim 19, wherein the resource mapping rule is based on a quasi co-location (QCL) association between the first and second sets of resources.

21. The method of claim 20, wherein the resource mapping rule allocates the second set of resources based on a specified delta in an angle of departure (AoD) according to the QCL association between the first and second sets of resources.

22. The method of claim 16,
wherein the resource mapping rule maps the second set of resources onto the same slot as the first set of resources, or
wherein the resource mapping rule allocates the second set of resources via a carrier switching procedure irrespective of whether the allocation of the second set of resources is tagged as an antenna-switching use case.

23. The method of claim 16, wherein the resource mapping rule allocates supplemental resources to the second set of resources that are not allocated to one or more other UL RSs that lack an association to a DL RS for positioning.

24. The method of claim 23,
wherein the supplemental resources include one or more additional subcarriers via setting a subcarrier skipping pattern so as not to skip any subcarriers in a frequency domain, or
wherein the supplemental resources include one or more additional subcarriers via subcarrier hopping, or
wherein the supplemental resources include an Angle of Departure (AoD) configuration, or
any combination thereof.

25. The method of claim 16,
wherein the at least one DL RS includes a plurality of periodically or semi-persistently transmitted DL RSs, or
wherein the at least one DL RS includes one or more DL RSs that are transmitted aperiodically.

26. The method of claim 16,
wherein the first set of resources includes a first bandwidth part (BWP), and the second set of resources includes the first BWP or a second BWP that is different than the first BWP, or
wherein the first set of resources includes a first component carrier (CC), and the second set of resources includes the first CC or a second CC that is different than the first CC, or
wherein the first set of resources includes a first frequency range, and the second set of resources includes the first frequency range or a second frequency range that is different than the first frequency range, or
wherein the first set of resources includes a first subcarrier spacing (SCS), and the second set of resources includes the first SCS or a second SCS that is different than the first SCS, or
wherein the first set of resources includes a first time behavior characteristic, and the second set of resources includes the first time behavior characteristic or a second time behavior characteristic that is different than the first time behavior characteristic, or
wherein the at least one UL RS corresponds to at least one Sounding Reference Signal (SRS) or at least one DeModulation Reference Signal (DMRS) on a Physical Uplink Shared Channel (PUSCH).

27. The method of claim 16, wherein the at least one UL RS is configured for at least one function separate from the positioning procedure.

28. The method of claim 27, wherein the at least one function is a codebook-based function, a non-codebook-based function, an uplink beam management function, or an antenna-switching function.

29. A network entity, comprising:

a memory;

at least one processor coupled to the memory and at least one transceiver and configured to:
- schedule, as part of a positioning procedure for a user equipment (UE), a first set of resources for transmission of at least one downlink (DL) reference signal (RS) by at least one base station to the UE;
- associate the at least one DL RS with at least one uplink (UL) RS for transmission by the UE on a second set of resources to one or more base stations as part of the positioning procedure for the UE; and
- transmit, to the UE, an indication of the association between the at least one DL RS and the at least one UL RS.

30. A user equipment (UE), comprising:

a memory;

at least one processor coupled to the memory and at least one transceiver and configured to:
- receive, from at least one base station as part of a positioning procedure for the UE, at least one downlink (DL) reference signal (RS) on a first set of resources;
- receive, from a network entity, an indication of an association between the at least one DL RS with at least one uplink (UL) RS for transmission by the UE; and
- transmit, to one or more base stations in response to the received indication, the at least one UL RS on a second set of resources as part of the positioning procedure for the UE.

* * * * *